United States Patent Office 2,806,796
Patented Sept. 17, 1957

2,806,796

METHOD OF DEHYDRATING FOOD

William R. Dorsey, Lafayette, Calif., assignor to Vacu-Dry Company, Oakland, Calif., a corporation of California No Drawing. Application October 26, 1953,
Serial No. 388,423

3 Claims. (Cl. 99—206)

This invention relates to a method of dehydrating and flavoring food. It is particularly adaptable in the flavoring and dehydration of juice concentrates such as frozen orange juice concentrate.

It is an object of this invention to provide a method for producing a dehydrated juice concentrate, which has an open sponge-like structure and which, upon reconstitution, has substantially the same flavor as the original juice.

Another object of this invention is to provide a process for dehydrating such food product with rapidity and economy and without a destruction of quality.

Further objects of this invention will become apparent upon an understanding of the following description of a selected embodiment of this invention and upon a study of the appended claims.

In practicing a selected embodiment of this invention, the applicant has used as a raw material a frozen partially dehydrated orange juice comprising from 50 to 60 percent solids and from 50 to 40 percent water. The fruit pulp content is about 6 to 15 percent by volume on a rehydrated basis.

The first step of the process is to heat the frozen orange juice concentrate to 90° F. as rapidly as possible. This thaws the orange juice concentrate and liquefies it.

The next step of the process is to mix the liquefied concentrate thoroughly with corn syrup solids. The concentrate and the corn syrup solids are mixed and beaten with a propeller type agitator. A suitable ratio is ten parts of concentrate to four parts of corn syrup solids. This reduces the pulp content so that it will puff more easily in the later steps of the process.

After the concentrate and corn syrup solids have been thoroughly mixed, the next step is to add a small quantity of sodium sulfite. The sodium sulfite helps preserve the color both during storage and during the processing steps hereinafter described.

The foregoing mixing steps cause some air to become entrapped in the mixture. The next step is to deaerate the product, for otherwise the product will splatter during the subsequent processing steps.

The following step is to spread the mixture upon trays preparatory to drying. A useful size tray is one that has a flat bottom between 18 inches and 2 feet wide by 42 inches long with a one inch lip around the outer edge of the bottom. The narrow width of the tray tends to prevent dishing, and maintains the depth of the tray constant. The tray should be made of a material which is neutral to the orange juice mixture, such as, for example, stainless steel. The mixture is spread on the trays in a quantity of approximately 5/10 pounds per square foot. The resulting thickness is found to be between 1/16 and 1/8 of an inch.

The trays are next transferred to a heated vacuum dehydrating chamber. A suitable vacuum dehydrating chamber is provided with shelves constructed of closely spaced tubes through which steam is circulated for rapidly heating the shelves, and through which water is circulated for rapidly cooling them. The chamber should be provided with a glass port so that the product may be watched during processing.

After the trays are transferred to the chamber, the chamber is closed, and the dehydration is commenced. Initially the chamber should be heated to 240° F. as rapidly as possible and the pressure should be reduced simultaneously and also as rapidly as possible. At first, the principal action is deaeration of the concentrate. After the concentrate is deaerated, about 13 minutes of processing should result in a pressure drop to less than 1/2 inch of mercury and preferably about 5/16 of an inch of mercury. The product begins to thicken and take a cake-like form.

The next step is to drop the temperature of the vacuum chamber as rapidly as possible to 200° F. This should be done within two minutes. The 200° F. temperature and a full vacuum are maintained for an additional 10 minutes.

After this 10 minute operation, the next step is to again drop the temperature of the chamber. This next drop is down to 175° F., and it is done rather slowly so that it takes a total of five minutes time to reduce the temperature from 200° F. to 175° F. A full vacuum is maintained and the temperature is held constant at 175° F. until a product temperature of approximately 155° is attained.

During these last operations, the product puffs and rises about 2 inches, much like a cake in an oven.

The product is now semi-solid and the next step is to cool the vacuum chamber to 80° F. as rapidly as possible so as to insure that the puffed product does not collapse. The temperature should be dropped from 175° F. to 100° F. within at least 3 1/2 minutes and the remainder of the drop down to 80° F. may take as long as 20 minutes. The product must be cooled to at least 90° F. to be sure that it does not collapse, although 80° F. is preferable.

The next step of the process is to break the vacuum and to remove the product from the vacuum dehydrating chamber to a dehumidified atmosphere. The product is removed from the trays, and it will be observed that it is very porous, something like a sponge or a piece of sponge cake.

The next step is to crush and grind the product in a mill to a fineness at which 100 percent will go through a 10-mesh screen, and 50 percent will go through a 40-mesh screen. The resulting product is granular-appearing, and it bears no resemblance to the porous sponge-like material referred to in an earlier part of this description.

The next step is to mix orange oil with molten sorbitol in the proportions of 5 percent orange oil and 95 percent sorbitol. This product is allowed to harden on trays and is milled to a consistency where it will go through a 10-mesh screen, but not through a 20-mesh screen. This orange oil-sorbitol mixture is then mixed with the powdered orange juice in the ratio of 1 percent orange oil-sorbitol mixture and 99 percent powdered orange juice. However, these proportions of orange oil-sorbitol mixture to orange powder may be varied to suit the needs in the finished product.

The final step is to package the powdered orange juice in a moisture-proof container. A permeable package of calcined lime which acts as a desiccant is added in each package in the well-known manner described in an article entitled Desiccants improve dry packs by Louis B. Howard, published in The Food Packer, March, 1945 issue, at page 31.

The resulting product has a moisture content in the range of between one-half of one percent and one percent moisture. In order to make a reconstituted orange juice product, it is merely necessary to add ordinary water to the powdered orange in the ratio of one part of powdered orange juice to nine parts of water. It has been found that the foregoing procedure results in a product which reconstitutes almost instantly, even in ice water. Upon reconstitution, the product can be distinguished from fresh orange juice only with great difficulty. Its flavor is comparable to that of reconstituted orange juice made from the commercially available frozen concentrates.

It has also been found that the foregoing method of preparation results in an economy of operation which has heretofore been unknown in this field.

It will be found in a practice of this method that certain variations may be followed, although some of the ranges of temperature and time are extremely critical in obtaining a satisfactory product. High shelf temperatures are used during the first part of the drying cycle, but the product temperature must not be permitted to rise too high in the initial stages of the drying, for otherwise the product will deteriorate. As the material becomes drier, it has been found that it can stand more heat without deterioration, and that the temperature may be increased toward the end of the drying steps to a high value immediately before the final temperature reductions. It has also been found that the product temperature should never exceed 160° F. during the herein described process because a marked deterioration of the product occurs just below that point. However, it has been found that a suitable product temperature may reach as high as 155° F. without deterioration. Further, the time interval during which heat is applied should be as short as possible, for the product is damaged by too long a time of heat application even at moderate temperatures. For example, 160 minutes was found to be too long, but 100 minutes was found to give a satisfactory product.

This invention is claimed as follows:

1. The method of producing a dehydrated orange juice from a frozen orange juice concentrate, which includes the steps of liquefying the frozen juice concentrate; adding corn syrup solids to the juice concentrate; raising the temperature of the concentrate syrup mixture rapidly to a product temperature of at least 140° F. but not exceeding 155° F.; simultaneously reducing the pressure as rapidly as possible to approximately 5/16" or less of mercury; maintaining the product at such elevated temperature and reduced pressure for a period of not exceeding substantially 100 minutes and until the product has been thoroughly puffed; thereafter rapidly reducing the temperature of the product to room temperature while maintaining it under reduced pressure; grinding the resulting product to a fine powder; and adding a crushed mixture of orange oil and sorbitol and packaging this product in a moisture-proof container in the presence of a desiccant.

2. The method of producing a dehydrated orange juice from a liquid orange juice concentrate, which includes the steps of raising the temperature of the concentrate rapidly to a product temperature of a least 140° F. but not exceeding 155° F.; simultaneously reducing the pressure as rapidly as possible to approximately 5/16" or less of mercury; maintaining the product at such elevated temperature and reduced pressure for a period of not exceeding substantially 100 minutes and until the product has been thoroughly puffed; thereafter rapidly reducing the temperature of the product to room temperature while maintaining it under reduced pressure; grinding the resulting product to a fine powder; adding a crushed mixture including orange oil; and packaging the final product in a moisture-proof container.

3. The method of producing a dehydrated orange juice from a frozen orange juice concentrate, which includes the steps of liquefying the frozen juice concentrate; adding corn syrup solids to the juice concentrate; raising the temperature of the concentrate syrup mixture rapidly to a product temperature of at least 140° F. but not exceeding 155° F.; simultaneously reducing the pressure as rapidly as possible to approximately 5/16" or less of mercury; maintaining the product at such elevated temperature and reduced pressure for a period of not exceeding substantially 100 minutes and until the product has been thoroughly puffed; thereafter rapidly reducing the temperature of the product to room temperature while maintaining it under reduced pressure; transferring the product to an atmosphere of low relative humidity; grinding the resulting product while in such atmosphere to a fine powder; adding a crushed mixture of orange oil and sorbitol to the product while in such atmosphere; and while still in such atmosphere, packaging the final product and a moisture permeable package of a desiccant in a moisture-proof container.

References Cited in the file of this patent

UNITED STATES PATENTS

| | | |
|---|---|---|
| 2,328,554 | Heyman | Sept. 7, 1943 |
| 2,396,561 | Flosdorf | Mar. 12, 1946 |
| 2,509,681 | Flosdorf | May 30, 1950 |
| 2,520,878 | Cotton | Aug. 29, 1950 |
| 2,566,410 | Griffin | Sept. 4, 1951 |